US011382311B2

(12) United States Patent
Willinger

(10) Patent No.: US 11,382,311 B2
(45) Date of Patent: Jul. 12, 2022

(54) DESTRUCTION RESISTANT PET TOY WITH ATTRACTANT AND METHOD OF MAKING SAME

(71) Applicant: Willinger Development LLC, Tenafly, NJ (US)

(72) Inventor: Jonathan Willinger, Tenafly, NJ (US)

(73) Assignee: Willinger Development LLC, Tenafly, NJ (US)

( * ) Notice: Subject to any disclaimer, the term of this patent is extended or adjusted under 35 U.S.C. 154(b) by 127 days.

(21) Appl. No.: 16/026,518

(22) Filed: Jul. 3, 2018

(65) Prior Publication Data

US 2020/0008398 A1 Jan. 9, 2020

(51) Int. Cl.
*A01K 15/02* (2006.01)
*A01K 29/00* (2006.01)

(52) U.S. Cl.
CPC .......... *A01K 15/026* (2013.01); *A01K 15/025* (2013.01)

(58) Field of Classification Search
CPC ............................ A01K 15/025; A01K 15/026
USPC .......................................... 119/709, 710, 711
See application file for complete search history.

(56) References Cited

U.S. PATENT DOCUMENTS

| | | | | |
|---|---|---|---|---|
| 848,136 A * | 3/1907 | Smith | ................. | A01K 15/025 119/711 |
| 1,022,112 A * | 4/1912 | Smith | ................. | A01K 15/025 119/711 |
| 1,302,174 A * | 4/1919 | Kettlie | ................. | A01K 15/025 119/711 |
| 5,351,650 A * | 10/1994 | Graves | ................. | A01K 15/025 119/707 |
| 5,476,408 A * | 12/1995 | Hoeting | ................. | A63B 43/00 446/409 |
| 6,237,538 B1 * | 5/2001 | Tsengas | ................. | A01K 5/0114 119/707 |
| 6,880,765 B2 * | 4/2005 | Tuomikoski | ........ | A01M 31/008 239/34 |
| 6,899,059 B1 * | 5/2005 | Crane | ................. | A01K 15/025 119/711 |
| 7,074,106 B1 * | 7/2006 | Deutsch | ............... | A01K 15/025 119/711 |
| 7,146,934 B1 * | 12/2006 | Staley | ................. | A01K 15/026 119/709 |
| 7,246,574 B2 * | 7/2007 | Renforth | ............... | A01K 15/025 119/702 |
| 7,278,374 B2 * | 10/2007 | Mann | ................. | A01K 15/026 119/51.03 |
| 7,926,450 B1 * | 4/2011 | Tsengas | ................. | A01K 15/025 119/707 |

(Continued)

*Primary Examiner* — David J Parsley
(74) *Attorney, Agent, or Firm* — Hassan Abbas Shakir; Shakir Law PLLC

(57) ABSTRACT

A destruction-resistant pet toy for a canine includes a main body for biting, grasping, or playing by the canine with its mouth; an attractant for attracting the canine, the attractant includes a scent source for emitting a scent; a cavity disposed in the main body for holding the attractant; and a plurality of scent passages for passing the scent to the canine, each scent passage having a first end at the cavity and a second end at an exterior surface of the main body. The destruction-resistant pet toy further includes an access channel for passing the attractant to the cavity, the access channel extending from an exterior surface of the main body to the cavity.

15 Claims, 8 Drawing Sheets

(56) References Cited

U.S. PATENT DOCUMENTS 9,554,561 B2 * 1/2017 Axelrod ............... A01K 15/026
9,596,832 B2 * 3/2017 Davison, III ........ A01K 15/026

* cited by examiner

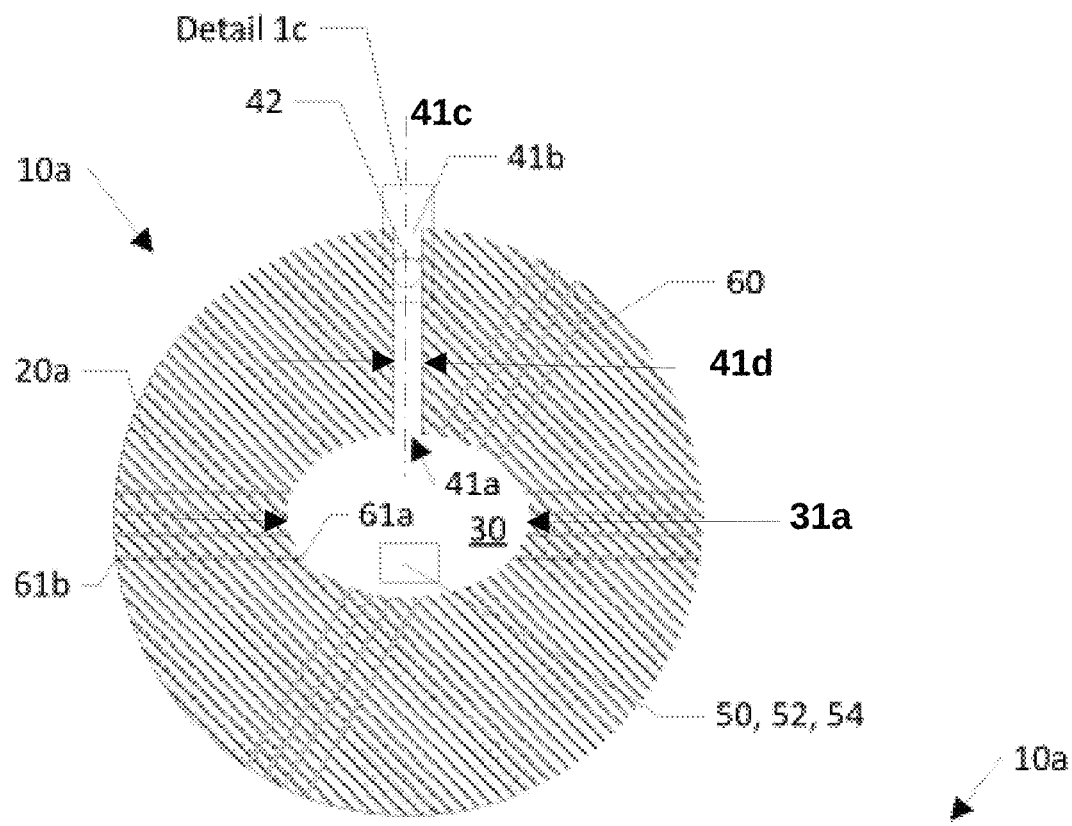
Fig. 1a
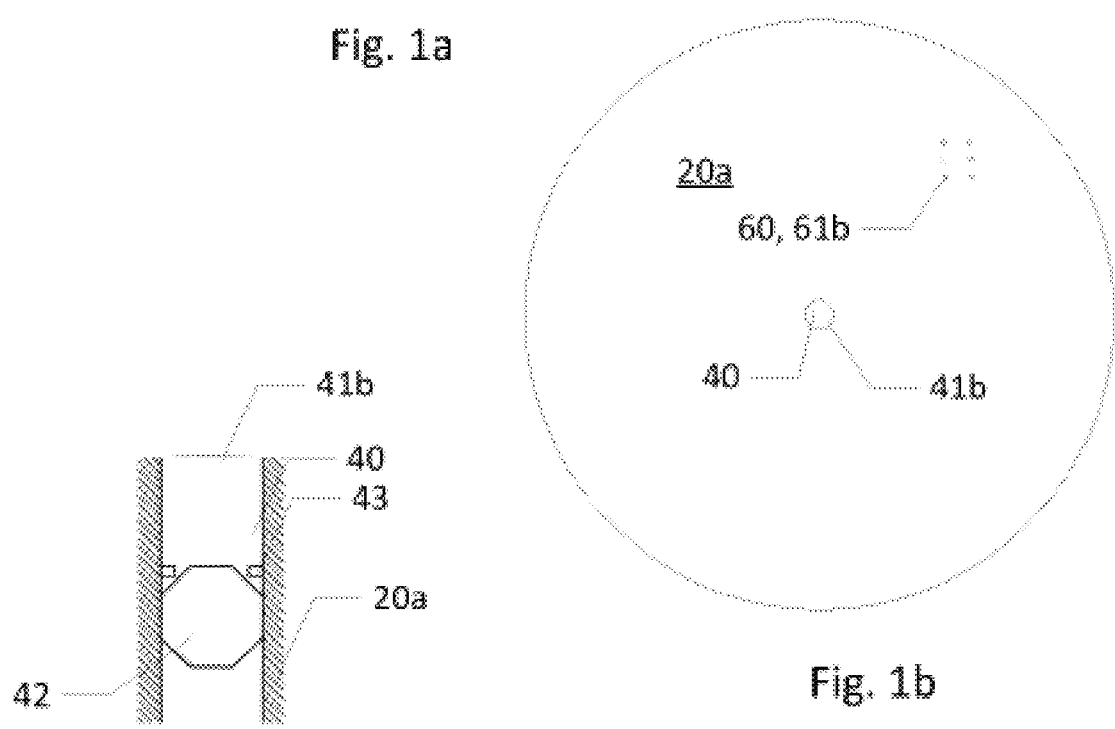
Fig. 1b
Fig. 1c

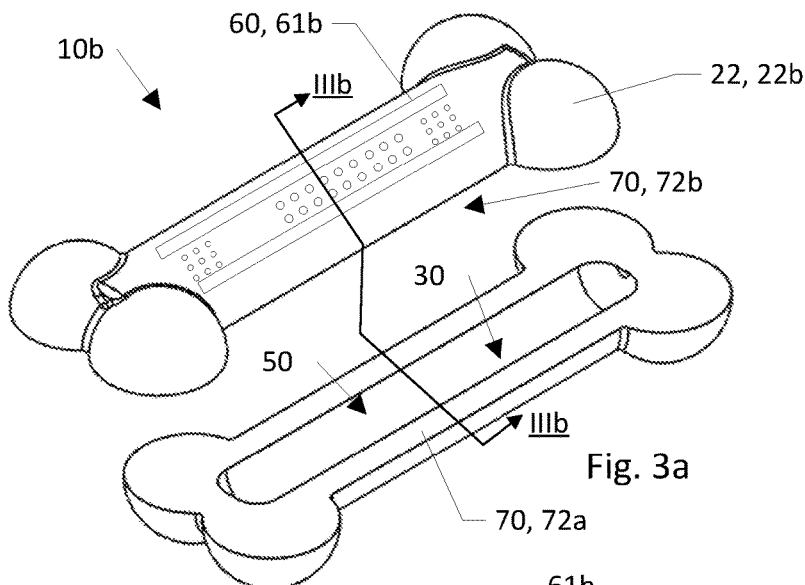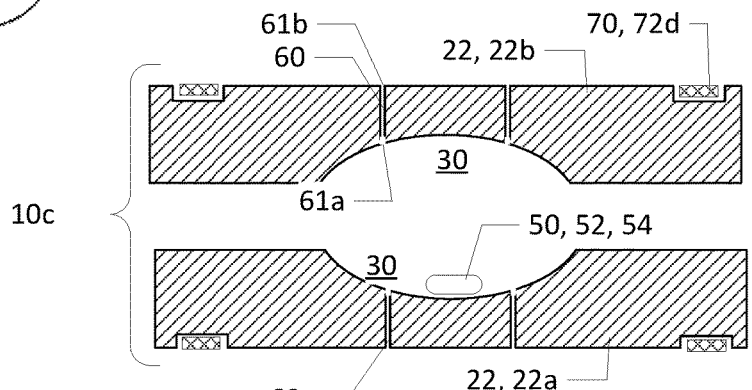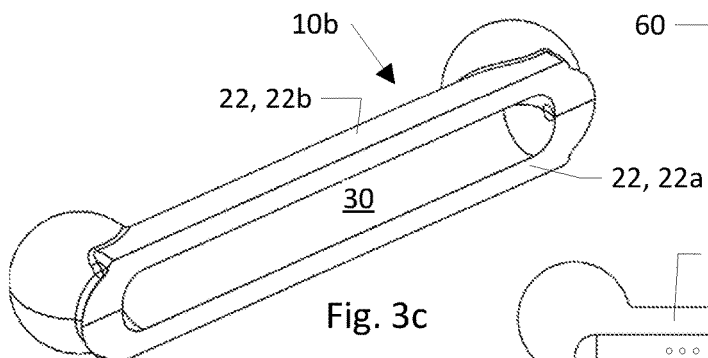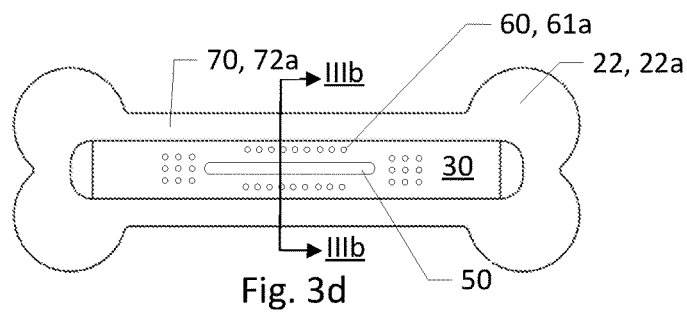

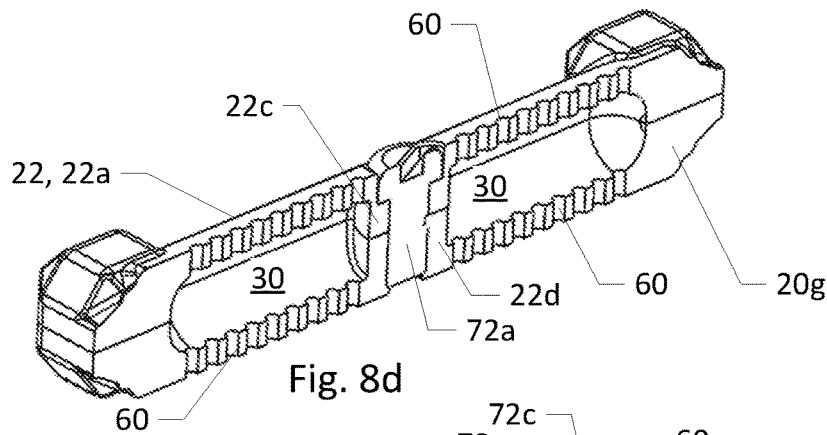
Fig. 8d
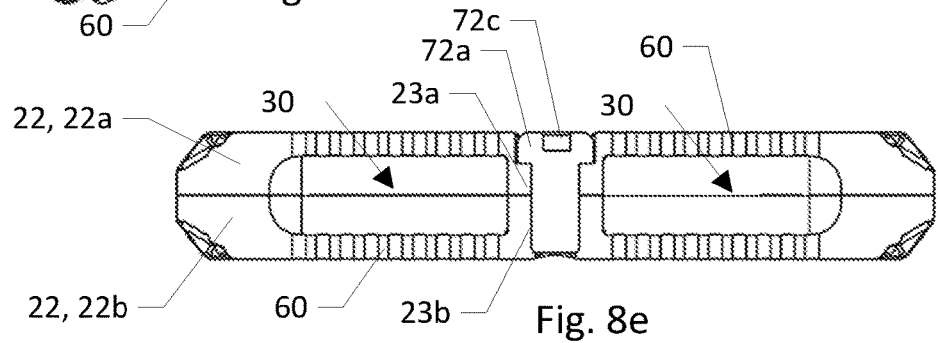
Fig. 8e
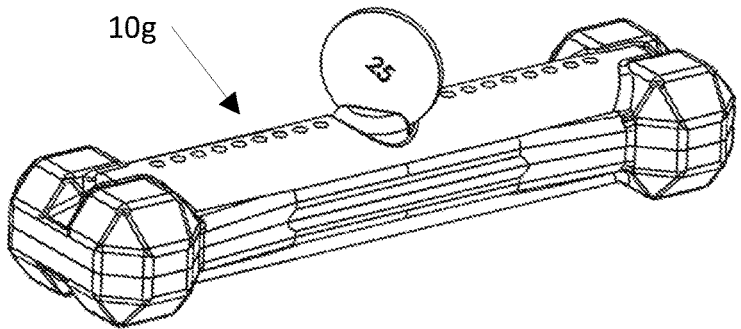
Fig. 8f
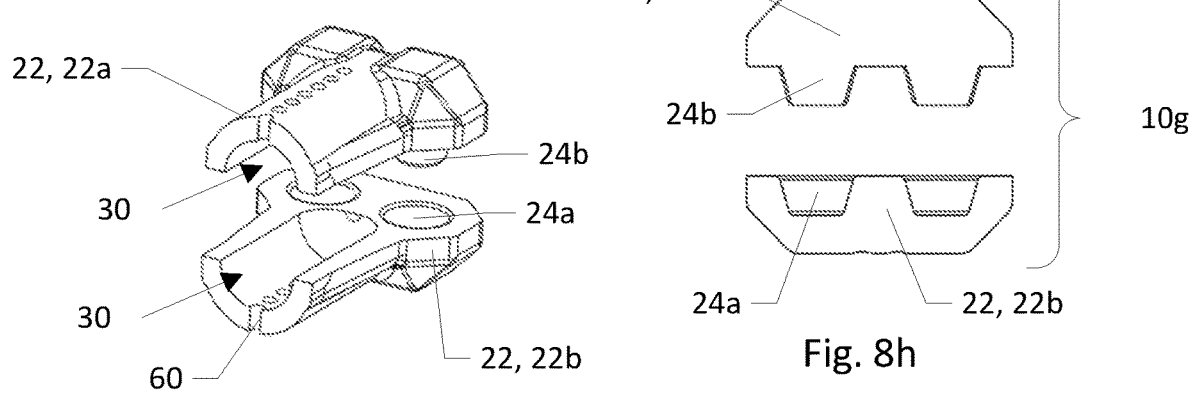
Fig. 8g
Fig. 8h

DESTRUCTION RESISTANT PET TOY WITH ATTRACTANT AND METHOD OF MAKING SAME

BACKGROUND OF THE INVENTION

1. Field of the Invention

The invention relates to one or more pet toys made of an extremely durable material and an attractant disposed in an inner space in the pet toy and a method of making the pet toys. More particularly, the invention relates to a pet toy having a nylon body and a scent attractant.

2. Discussion of the Related Art

Pets such as dogs are naturally curious and require one or more pet toys to maintain mental stimulation. Typically, pet toys, especially pet toys for dogs, are made of a natural rubber, artificial (synthetic) rubber, thermoplastic elastomer (TPE) based material, nylon, or a plush material. However, certain breeds and individual dogs are aggressive biters or gnawers, generally known in the art and/or in this application as "destructive chewers," who destroy natural rubber, artificial (synthetic) rubber, TPE-based and plush toys easily. To increase a toy's life span, nylon chew toys are preferred.

Thus, what is need is a pet toy that is extremely durable to resist chewing action by a destructive chewer, that keeps the pet engaged with the toy, and that is economical to produce.

SUMMARY OF THE INVENTION

These and other needs are met by a pet toy of the present invention.

A destruction-resistant pet toy for a canine includes
a main body for biting, grasping, or playing by the canine with its mouth;
an attractant for attracting the canine, the attractant includes a scent source for emitting a scent;
a cavity disposed in the main body for holding the attractant; and
a plurality of scent passages for passing the scent to the canine, each scent passage having a first end at the cavity and a second end at an exterior surface of the main body.

The destruction-resistant pet toy further includes an access channel for passing the attractant to the cavity, the access channel extending from an exterior surface of the main body to the cavity.

The destruction-resistant pet toy further includes a closure for closing the access channel. In accordance with one or more embodiments of the present invention, the closure may be a screw and one or more threads in one or more main body portions for securing the screw.

The destruction-resistant pet toy further includes a plurality of detents extending into the access channel, the detents for preventing the closure from unintended dislodgment from the access channel.

The main body includes a first body portion and a second body portion, the first body portion being separate from the second body portion.

A fastening assembly joins the first body portion and the second body portion together. The fastening assembly comprises a locking assembly, a screw post and a locking nut, or a band.

A destruction-resistant pet toy for a canine includes
a main body for biting, grasping, or playing by the canine with its mouth;
an attractant for attracting the canine, the attractant includes a scent source for emitting a scent and a substrate;
a cavity disposed in the main body for holding the attractant;
a plurality of scent passages for passing the scent to the canine, each scent passage having a first end at the cavity and a second end at an exterior surface of the main body; and
an access channel for passing the attractant to the cavity, the access channel extending from an exterior surface of the main body to the cavity.

BRIEF DESCRIPTION OF THE DRAWINGS

FIG. 1a is a cross-sectional view of a destruction-resistance pet toy in accordance with one or more embodiments of the present invention.

FIG. 1b is a top view of the destruction-resistant pet toy of FIG. 1a.

FIG. 1c is a detail view of a portion of the destruction-resistant pet toy of FIG. 1a.

FIG. 3a is an isometric view of two body portions of a destruction-resistant pet toy in accordance with one or more embodiments of the present invention FIG. 3b is a cross-sectional view of the destruction-resistant pet toy of FIG. 3a in accordance with one or more embodiments of the present invention.

FIG. 3c is a cross-sectional view of a longitudinal half of the destruction-resistant pet toy of FIG. 3a in accordance with one or more embodiments of the present invention.

FIG. 3d is a plan view of a body portion of the destruction-resistant pet toy of FIG. 3a in accordance with one or more embodiments of the present invention.

FIG. 8*d* is an isometric cross-sectional view of the destruction-resistant pet toy of FIG. 8*a*.

FIG. 8*e* is a front cross-sectional view of the destruction-resistant pet toy of FIG. 8*a*.

FIG. 8*f* is an isometric view of the destruction-resistant pet toy of FIG. 8*a* being opened with a coin.

FIG. 8*g* is an isometric cross-sectional view of the destruction-resistant pet toy of FIGS. 8*a*-8*c*.

FIG. 8*h* is a cross-sectional view of the destruction-resistant pet toy of FIGS. 8*a*-8*c*.

DETAILED DESCRIPTION OF THE INVENTION

Figure 2A:
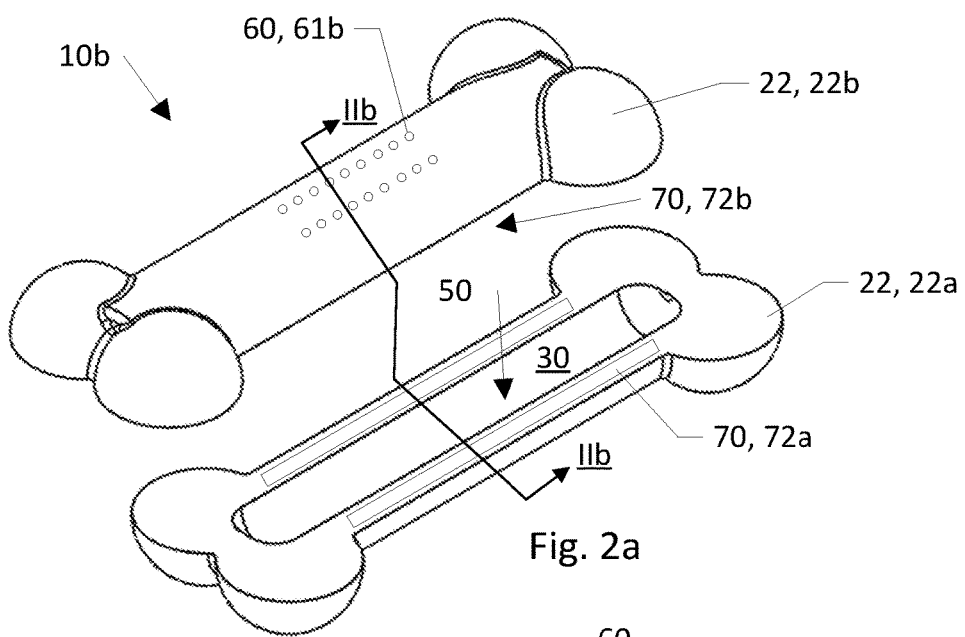
FIG. 2a is an isometric view of two body portions of a destruction-resistant pet toy in accordance with one or more embodiments of the present invention
Figure 2B:
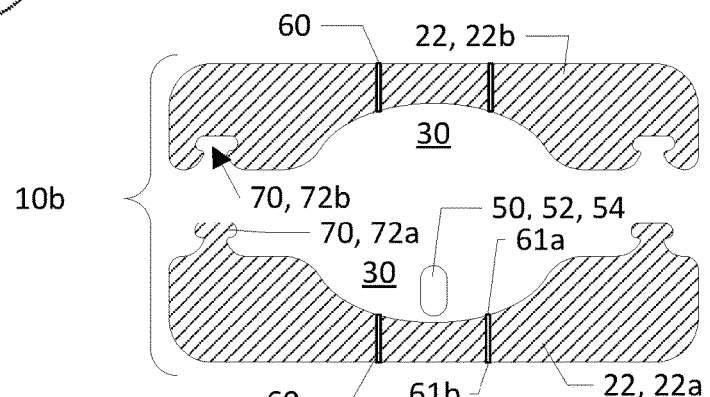
FIG. 2b is a cross-sectional view of the destruction-resistant pet toy of FIG. 2a in accordance with one or more embodiments of the present invention.
Figure 2C:
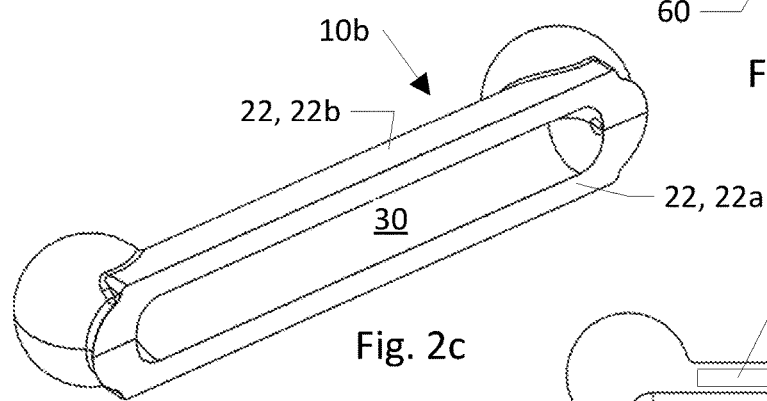
FIG. 2c is a cross-sectional view of a longitudinal half of the destruction-resistant pet toy of FIG. 2a in accordance with one or more embodiments of the present invention.
Figure 2D:
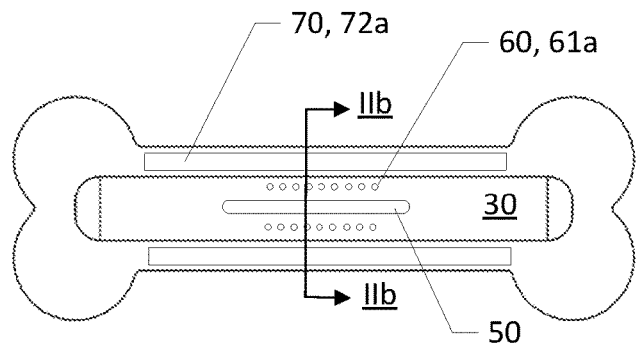
FIG. 2d is a plan view of a body portion of the destruction-resistant pet toy of FIG. 2a in accordance with one or more embodiments of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Definitions

All technical and scientific terms shall have the same meaning as commonly understood by one of ordinary skill in the art. Nonetheless, the following terms defined below aid in the understanding of the disclosure. The definitions apply to all parts of speech of the term regardless whether the term is defined explicitly as such.

Accordingly, the meaning of specific terms or words used in the specification and the claims should not be limited to the literal or commonly employed sense, but should be construed in accordance with the spirit and scope of the disclosure. The definitions of these terms, therefore, may be determined based on the contents throughout the specification. Where not defined, the meaning of all terms will be clear from the context of the description.

Like numbers refer to like elements throughout, and explanations that duplicate one another are omitted.

"A" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

"About," "approximately," or "substantially similar" refer to one or more industry-accepted tolerances for the corresponding term and/or relativity between elements. Where such industry-accepted tolerances for the corresponding term are unknown, difficult to determine, inconsistent, or subject to experimentation, "about," "approximately," or "substantially similar" refer to a 10% variation from the nominal value. Even if not explicitly stated, it is understood that a variation is always included in a given value, whether or not the variation is specifically referenced. In accordance with one or more embodiments of the present invention, "about," "approximately," or "substantially similar" mean within 5% of the reported numerical value. In accordance with one or more embodiments of the present invention, "about," "approximately," or "substantially similar" mean within 10, 9, 8, 7, 6, 5, 4, 3, 2, or 1% of the reported numerical value.

"Comprises," "comprising," "includes," "including," "has," "having," "contains," or "containing," or any other variation thereof are used to describe and claim a non-exclusive inclusion such that a composition, a mixture, process, method, article, or apparatus that comprises a list of elements is not necessarily limited to only those elements but can include other elements not expressly listed or inherent to such composition, mixture, process, method, article, or apparatus. "Comprises," "comprising," "includes," "including," "has," "having," "contains," or "containing," or any other variation thereof may also be understood to mean "including, but not limited to."

"Connector," "fastener," or "fastening device" shall in the singular and plural refer to any device used for mechanically joining two or more parts, components, or the like together for its intended purpose whether temporary or permanent, including a screw, nail, anchors, clamp, cotter pin, retainer, clip, or any other device known or yet to be developed. "Connector," "fastener," or "fastening device" shall in the singular and plural refer to an adhesive, cement, glue, or the like. Where a specific embodiment of a "connector," "fastener," or "fastening device" is disclosed it shall be understood to be the preferred embodiment of a "connector," "fastener," or "fastening device" for reasons of economy, structural integrity, longevity and/or ease of installation.

"Component" shall in the singular and plural refer to one or more parts, elements, pieces, or other items related to a portion of the present invention.

"Invention" or "present invention" are non-limiting terms and not intended to refer to any single aspect of the particular invention but encompass all possible aspects as described in the specification and the claims.

Hardness is a measure of the resistance to localized plastic deformation induced by either mechanical indentation or abrasion. Hardness is dependent on ductility, elastic stiffness, plasticity, strain, strength, toughness, viscoelasticity, and viscosity. In this application, hardness may be determined by a Shore durometer measurement.

"Material" or "materials" are non-limiting terms and refer to matter from which a thing is or can be made and is an input to one or more production or manufacturing processes. "Material" or "materials" inherently have thermal, optical, electrical, magnetic, and/or mechanical properties and specifically two materials can differ by these properties. For example, a first material may differ from a second material by hardness.

"Molded" or "molding" shall mean any type of molding known in the art.

"Mounted," "mounted in," or "integrated" shall mean that a first element is directly secured to or in a second element or have intervening elements be present between the first and second element. "Directly mounted" or "directly mounted in" shall mean that no intervening element is present between the first and second element and that the first element is in contact with the second element.

"On," "over," "disposed on," "disposed against," and/or "disposed over," shall mean that a first element can be directly located on a second element or have intervening elements be present between the first and second element. "Directly on," "directly over," "directly against," directly disposed against," "directly disposed on," and/or "directly disposed over" shall mean that no intervening element is present between the first and second element and that the first element is in contact with the second element.

"One embodiment," "an embodiment," "exemplary embodiment," or variations thereof means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

"Suitable" or "suitably" in this application refers to a size and/or shape that maintains the structural integrity of the invention and/or permits the intended use of the invention by its intended user in a normal or advantageous manner.

"User" in the singular and the plural refers to a person, entity, and/or other group uses one or more aspects of the present invention.

First Embodiment

With reference to FIGS. 1a-1c, in accordance with one or more embodiments of the present invention, a destruction-resistant pet toy 10a is intended for a dog or other animal prone to aggressive biting, gnawing, or chewing behavior, i.e. a destructive chewer. Destruction-resistant pet toy 10a includes a main body 20a comprising or consisting of a destruction resistant material;

the pet toy further comprises a cavity 30, an access channel 40 to cavity 30; an attractant 50, and one or more scent passages 60.

In accordance with one or more embodiments of the present invention, the "destruction resistant material" is defined as comprising polycaprolactam. Polycaprolactam is also known as nylon 6 or polyamide 6. Preferably, the destruction resistant nylon has a density of 1.13 g/cm$^3$, hardness of 71 Shore D, a heat distortion temperature of 53° C. at 264 psi, a melting point of 220a° C., and a relational viscosity of 2.3.

In accordance with one or more embodiments of the present invention, the "destruction resistant nylon" is defined as consisting only of or substantially only of polycaprolactam.

In accordance with another embodiment, the "destruction resistant nylon" is defined as consisting of a material having hardness of 68-75 durometer Shore D.

In accordance with one or more embodiments of the present invention, the "destruction resistant nylon" is defined as comprising or consisting of one of nylon 6/6, nylon 6/12, polyamide 12, nylon 121, nylon 12, or polyamide 46.

In accordance with one or more embodiments of the present invention, the "destruction resistant material" is defined as comprising urethane, natural rubber, artificial (synthetic) rubber, and/or thermoplastic elastomer.

The base costs of the destruction resistant material and/or the destruction resistant nylon is competitive with other materials used in pet toys and the manufacturing method, typically injection molding or pressure molding, provides significant economic advantages that can be passed on to purchasers.

Main body 20a is for biting, grasping, and/or playing by a canine with its mouth. The main body 20a comprises, consists, or consists substantially of one of the varieties of destruction resistant nylon defined in this application, and therein is preferably molded of the destruction resistant material. Body 20a may have any suitable size and/or suitable shape and solely for purposes of explaining pet toy 10a has a unitary main body 20a.

"Suitable" or "suitably" in this context refers to a size and/or shape that permit easy biting, grasping, and/or playing by a canine with its mouth, but it also refers to a size and/or shape that permits easy handling and/or throwing by the canine's owner. This, preferably, comprises a cylindrical shape, a truncated cone, a suitably sized ball, or stylized representation of a geometric object or anthropomorphic representation of an animal.

Cavity 30 is disposed in main body 20a and if preferably created during the molding process of main body 20a. Cavity 30 may be any suitable shape for housing attractant 50. "Suitable" or "suitably" in this context refers to a size and/or shape that permit attractant 50 to be inserted and held in cavity 30 so that it operatively releases a scent through passages 60 that a canine playing with the pet toy can detect by the sense of smell.

Attractant 50 preferably comprises a scent source 52 emitting a scent and a substrate 54 onto which scent source 52 is disposed. A canine will by its olfactory sense be attracted to the scent from scent source 52. In accordance with one or more embodiments of the present invention, scent source 52 may be a liquid or a solid. One or more chemical compounds in scent source 52 are volatized, generally at a very low concentration, and perceived by the sense of smell by the canine. Scent source 52 is sprayed on all or a portion of substrate 54. In accordance with one or more embodiments of the present invention, scent source 52 may be a combination of a plurality of scents.

Substrate 54 may have any form and be a foam, paper, cardboard, an absorbent material, a cloth, a fabric material, or the like that absorbs scent source 52. In accordance with one or more embodiments of the present invention, scent source 52 may be sprayed onto one or more exterior surfaces of substrate 54.

Access channel 40 is preferably a channel formed in main body 20a connecting cavity 30 at first end 41a of access channel 40 to an exterior surface 11 of pet toy 10a at a second end 41b of access channel 40.

In accordance with one or more embodiments of the present invention, access channel 40 is sized to pass substrate 54 when in a rolled up state from exterior surface 11 of pet toy 10a to cavity 30. In accordance with one or more embodiments of the present invention, substrate 54 when in a rolled up state has a size so that substrate 54 is able to pass via access channel 40 in the rolled up state from exterior surface 11 of pet toy 10a to cavity 30.

In accordance with one or more embodiments of the present invention, as shown in FIG. 1a, access channel 40 comprises a longitudinal feed axis 41c and an access channel width 41d perpendicular to longitudinal feed axis 41c and parallel to a scent passage. Cavity 30 comprises a cavity width 31a perpendicular to longitudinal feed axis 41c. Access channel width 41d being smaller than cavity width 31a.

In accordance with one or more embodiments of the present invention, access channel 40 is a longitudinal channel or a curved channel. Access channel 40 preferably comprises a circular cross-section and one or more ends that are chamfered, and preferably includes a cross-section that narrows from second end 41b to first end 41a to prevent a closure 42 from entering cavity 30.

Closure 42 may have any suitable shape and any suitable device that is disposed in or on pet toy 10a to seal off access channel 40 to restrict access channel to cavity 30 from exterior surface 11 of pet toy 10 or prevent substrate 54 from being scunintentionally dislocated from cavity 30. Preferably, closure 42 comprises, consists, or consists substantially of one of the varieties of destruction resistant nylon defined in this application plug In accordance with one or more embodiments of the present invention, closure 42 is a plug forcibly placed into access channel 40, as discussed below, or may be a thread and screw as illustrated with respect to the seventh embodiment. To aid in retaining closure 42 in access channel 40, one or more detents 43 are placed in access channel 40 so that the detents are spaced from second end 41b. To secure access channel 40, a user pushes closure 42 from second end 41b past detents 43. Detents 43 extend into access channel 40 and deter removal of closure 42.

In accordance with one or more embodiments of the present invention, closure 42 comprises a first screw thread that engages a second screw thread in access channel 40. Preferably, either or both screw thread comprises a self-locking screw thread that prevents against unintended disengagement.

A plurality of scent passages 60 are disposed in main body 20a and preferably comprise or consist of one or more longitudinal passage connecting cavity 30 at first end 61a of access channel 40 to an exterior surface 11 of pet toy 10a at a second end 61b. Scent passages 60 may have any suitable cross-sectional shape, but preferably are circular in cross-section and may be created by drilling through main body 20a or by molding.

Figure 6A:
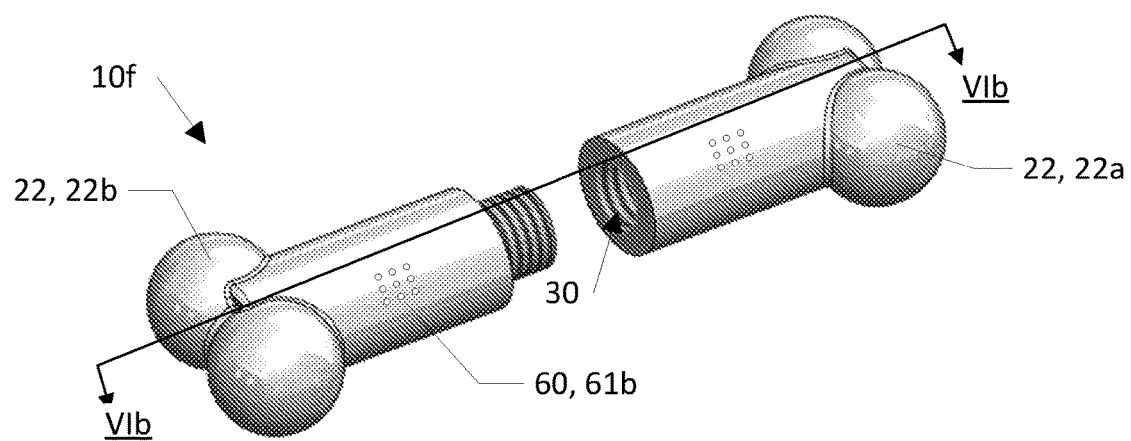
FIG. 6a is an isometric view of two body portions of a destruction-resistant pet toy in accordance with one or more embodiments of the present invention
Figure 6B:
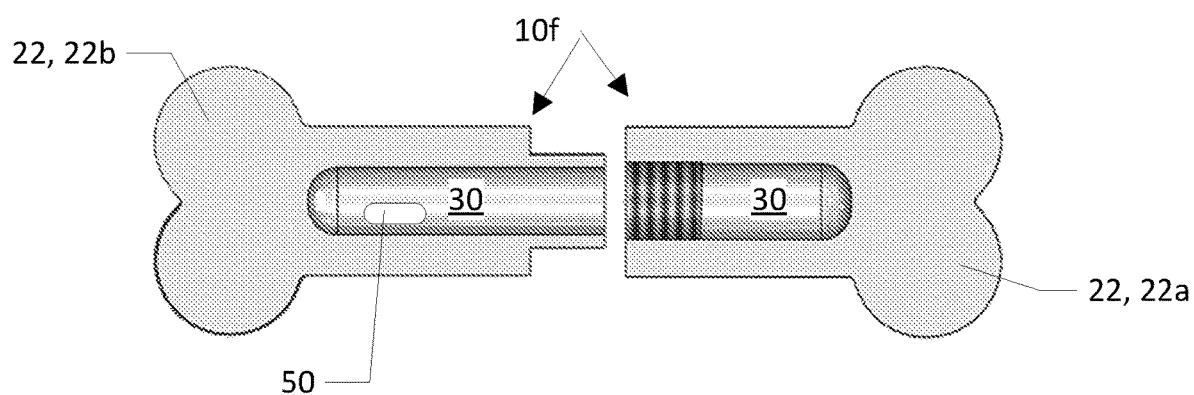
FIG. 6b is a cross-sectional view of the destruction-resistant pet toy of FIG. 6a in accordance with one or more embodiments of the present invention.
Figure 7A:
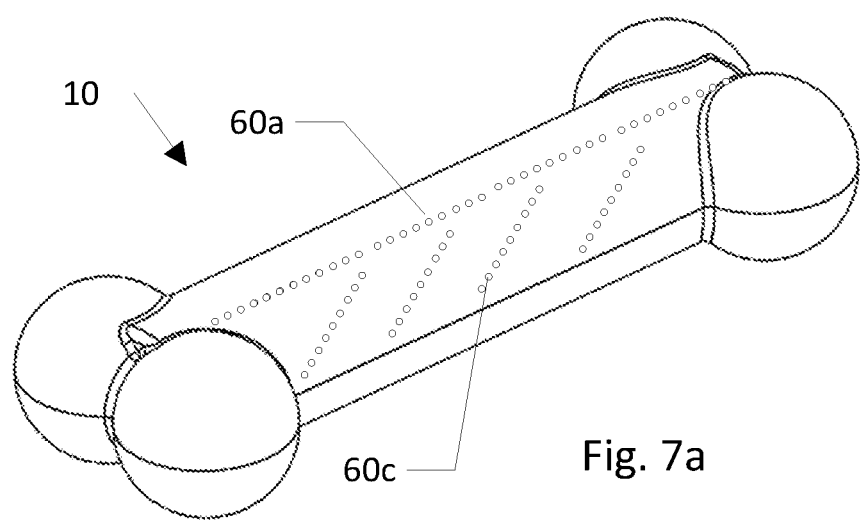
FIGS. 7a-7c are isometric views of a destruction-resistant pet toy showing arrangements of scent passages on an exterior surface of the destruction-resistant pet toy.
Figure 7B:
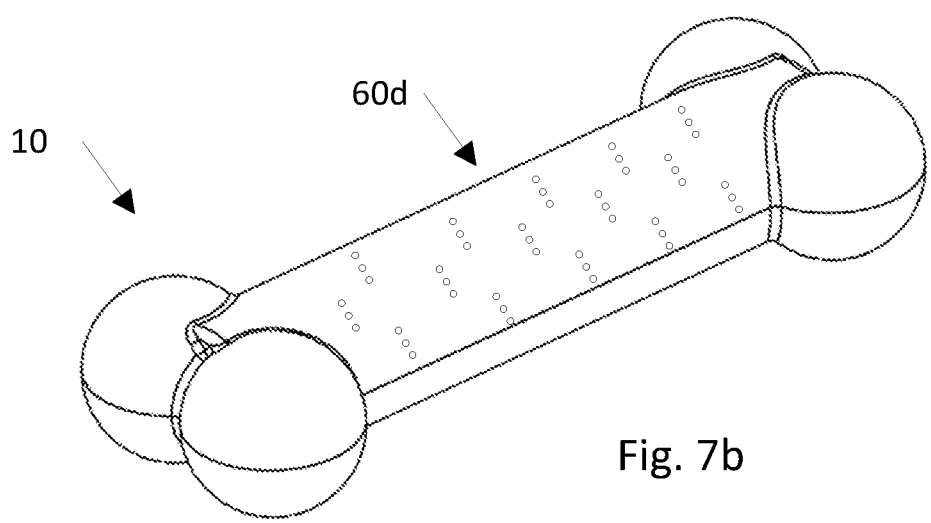
Figure 7C:
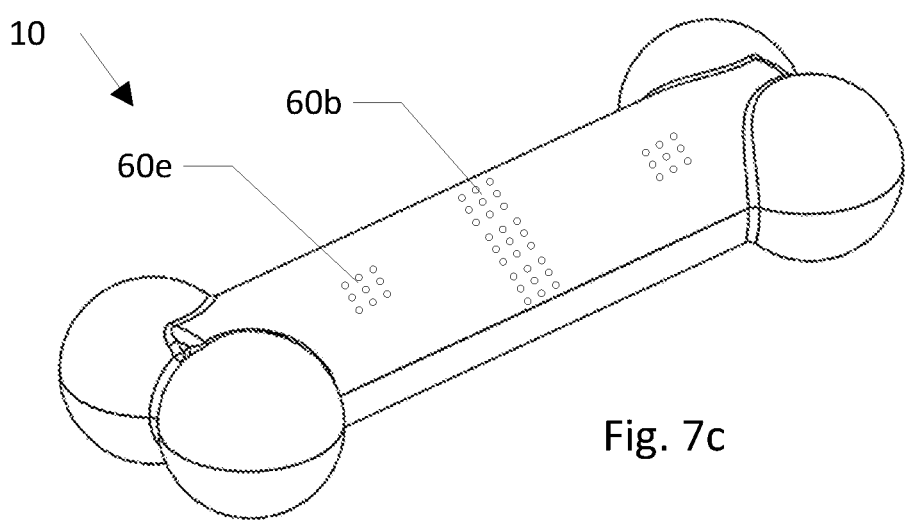
Figure 8A:
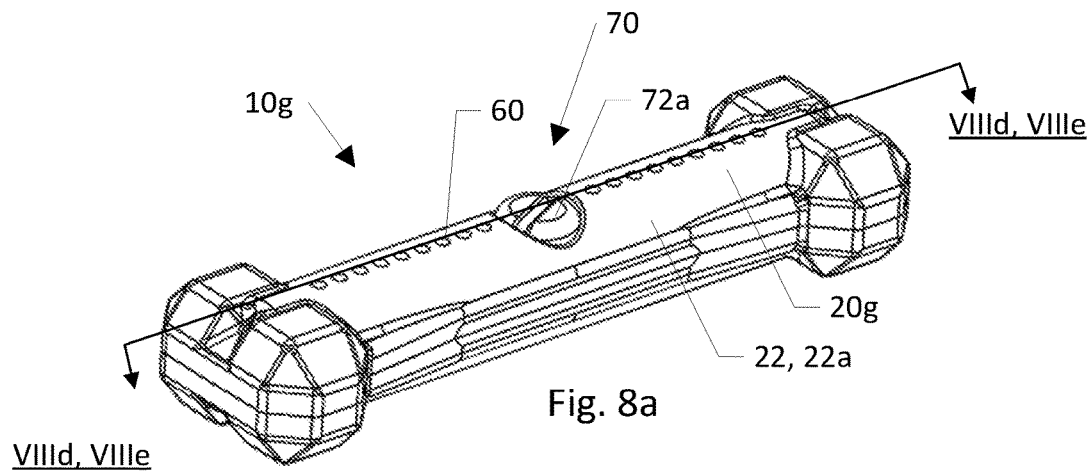
FIGS. 8a-8c are isometric views of a destruction-resistant pet toy in accordance with one or more embodiments of the present invention.
Figure 8B:
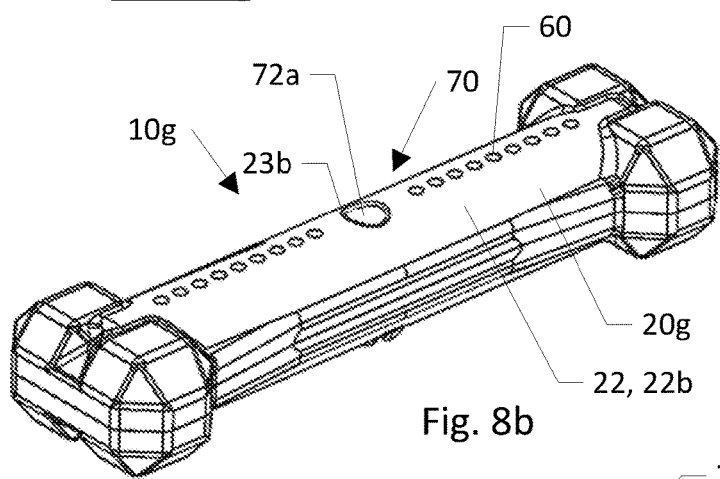
Figure 8C:
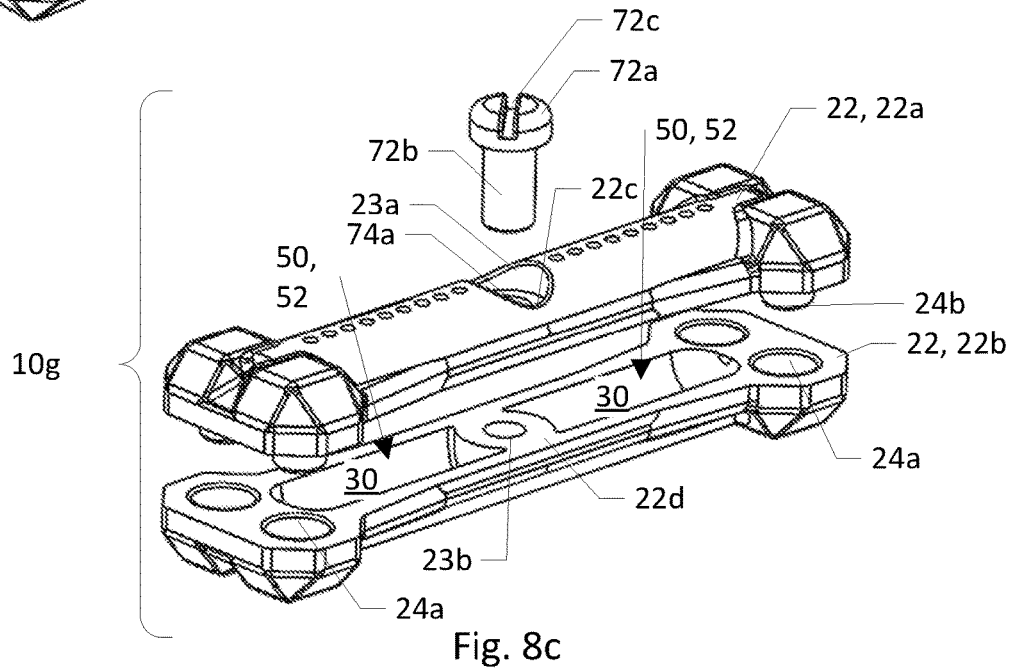

Scent passages 60 may be disposed evenly through main body 20a or disposed to have the least length individual and/or collective length necessary to emit a scent. With reference to FIGS. 7a-7c and illustrated only for convenience with regard to a bone-shaped destruction-resistant pet toy, scent passages 60 may be disposed in a continuous longitudinal line 60a or band 60b for consistent air flow, in a pattern 60c diagonally to a longitudinal centerline for intermittent scent emission, in a random or pseudo-random pattern, a specific location clusters 60e suitable for toys as illustrated in FIGS. 6a and 6b, and/or combination thereof.

In accordance with one or more embodiments of the present invention, in a first step, pet toy 10a is made by molding main body 20a around a cam mold portion comprising a shape for cavity 30 and access channel 40. If one or more scent passages 60 have not been molded into the main body during the first step, in a second step, one or more scent passages 60 are made, preferably by drilling, into main body 20a. In a third step, one or more attractants 50 (imbued with the scent source) are reduced in size and passed from the second end of access channel 40 into cavity 30 to deposit the attractant in cavity 30. In a final step, pet toy 10a is then tagged and processed as necessary for retail sales.

In accordance with one or more embodiments of the present invention, in a first step, pet toy 10a is made by molding main body 20a around a cam mold portion comprising a shape for cavity 30 and access channel 40. One or more scent passages 60 are at the same time formed as a portion of one or both of the mold halves for main body 20a comprise longitudinal member for forming the one or more scent passages. In a second step, one or more attractants 50 (imbued with the scent source) are reduced in size and passed from the second end of access channel 40 into cavity 30 to deposit the attractant in cavity 30. In a final step, pet toy 10a is then tagged and processed as necessary for retail sales.

In accordance with one or more embodiments of the present invention, in a first step, pet toy 10a is made by molding main body 20a around a cam mold portion comprising a shape for cavity 30 and access channel 40. If one or more scent passages 60 have not been molded into the main body during the first step, in a second step, one or more scent passages 60 are made, preferably by drilling, into main body 20a. In a third step, one or more attractants 50 (imbued with the scent source) are reduced in size and passed from the second end of access channel 40 into cavity 30 to deposit the attractant in cavity 30. In a final step, pet toy 10a is then tagged and processed as necessary for retail sales.

Second Embodiment

With reference to FIGS. 2a-2d, in accordance with one or more embodiments of the present invention, a pet toy 10b is substantially identical to pet toy 10a; however, pet toy 10b comprises a main body 20b having a plurality of body portions 22 and without access channel 40. The plurality of body portions 22 may be any suitable number of portions and may be greater than those used herein to illustrate pet toy 10b, wherein a first portion 22a and a second portion 22b are illustrated. The first portion 22a is physically separated from the second portion 22b. Cavity 30 may be disposed entirely in one portion 22, or partially in several portions 22, or one cavity 30 in each of portions 22.

Pet toy 10b further comprises a fastening assembly 70 to secure one body portion 22 to another body portion 22, e.g. first portion 22a and second portion 22b. Fastening assembly 70 may be a locking slide assembly, wherein first portion 22a comprises a first member 72a that is received by a second member 72b that is disposed on the second portion 22b. Members 72a and 72b lock each other to prevent unintended disengagement of portions 22a and 22b from each other.

In accordance with one or more embodiments of the present invention, in a first step, pet toy 10b is made by molding each portion 22 of main body 20b. If one or more scent passages 60 have not been molded into the main body during the first step, in a second step, one or more scent passages 60 are made, preferably by drilling, into one or more or all portions 22 of main body 20b. In a third step, one or more attractants 50 (imbued with the scent source) are reduced in size and passed from the second end of access channel 40 into cavity 30 to deposit the attractant in cavity 30. In a fourth step, all portions 22 are locked together using locking members. In a final step, pet toy 10b is then tagged and processed as necessary for retail sales.

Third Embodiment

With reference to FIGS. 3a-3d, in accordance with one or more embodiments of the present invention, a pet toy 10c is substantially identical to pet toy 10a and 10b. Pet toy 10c comprises a main body 20c having a plurality of body portions 22 and without access channel 40. The plurality of body portions 22 may be any suitable number of portions and may be greater than those used herein to illustrate pet toy 10b, wherein a first portion 22a and a second portion 22b are illustrated. Cavity 30 may be disposed entirely in one portion 22, or partially in several portions 22, or one cavity 30 in each of portions 22.

Pet toy 10c further comprises a fastening assembly 70 to secure one body portion 22 to another body portion 22, e.g. first portion 22a and second portion 22b. In accordance with one or more embodiments of the present invention, a groove 72c is placed on an exterior surface of each portion. A band 72d then holds the portions together to prevent unintended disengagement of portions 22a and 22b from each other. Band 72d may be a nylon molded into groove 72c, or a natural rubber material.

In accordance with one or more embodiments of the present invention, in a first step, pet toy 10c is made by molding each portion 22 of main body 20c. If one or more scent passages 60 have not been molded into the main body during the first step, in a second step, one or more scent passages 60 are made, preferably by drilling, into one or more or all portions 22 of main body 20b. In a third step, one or more attractants 50 (imbued with the scent source) are placed in cavity 30, advantageously, without being reduced in size. In a fourth step, all portions 22 are banded together, i.e. band 72d is placed into groove 72c. In a final step, pet toy 10c is then tagged and processed as necessary for retail sales.

Fourth Embodiment

Figure 4:
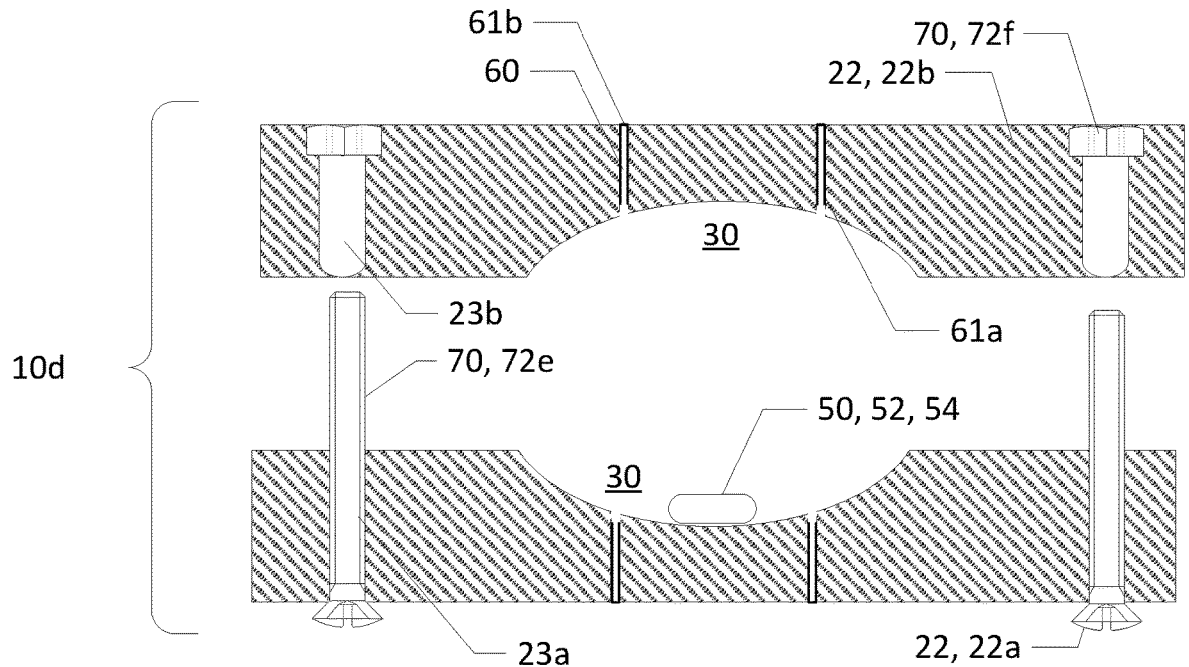
FIG. 4 is a cross-sectional view of a longitudinal half of the destruction-resistant pet toy in accordance with one or more embodiments of the present invention.

With reference to FIG. 4, in accordance with one or more embodiments of the present invention, a pet toy 10d is substantially identical to pet toy 10a and 10b. Pet toy 10c comprises a main body 20c having a plurality of body portions 22 and without access channel 40. The plurality of body portions 22 may be any suitable number of portions and may be greater than those used herein to illustrate pet toy 10b, wherein a first portion 22a and a second portion 22b are illustrated. Cavity 30 may be disposed entirely in one portion 22, or partially in several portions 22, or one cavity 30 in each of portions 22.

Pet toy 10d further comprises a fastening assembly 70 to secure one body portion 22 to another body portion 22, e.g. first portion 22a and second portion 22b. In accordance with one or more embodiments of the present invention, fastening assembly 70 comprises a screw post 72e that passes through an opening 23a in portion 22b and a locking nut 72f. In accordance with one or more embodiments of the present invention, fastening assembly 70 comprises a screw post 72e that is molded in portion 22a and an opening 23b is created in portion 22b in and a locking nut 72f.

In accordance with one or more embodiments of the present invention, in a first step, pet toy 10d is made by molding main body 20a including screw post 72e. If one or more scent passages 60 have not been molded into the main body during the first step, in a second step, one or more scent passages 60 are made, preferably by drilling, into main body 20a. In a third step, the portions 22 are then joined together via the fastening assembly 70. In a third step, one or more attractants 50 (imbued with the scent source) are placed in cavity 30, advantageously, without being reduced in size. In a final step, pet toy 10a is then tagged and processed as necessary for retail sales.

Fifth Embodiment

Figure 5:
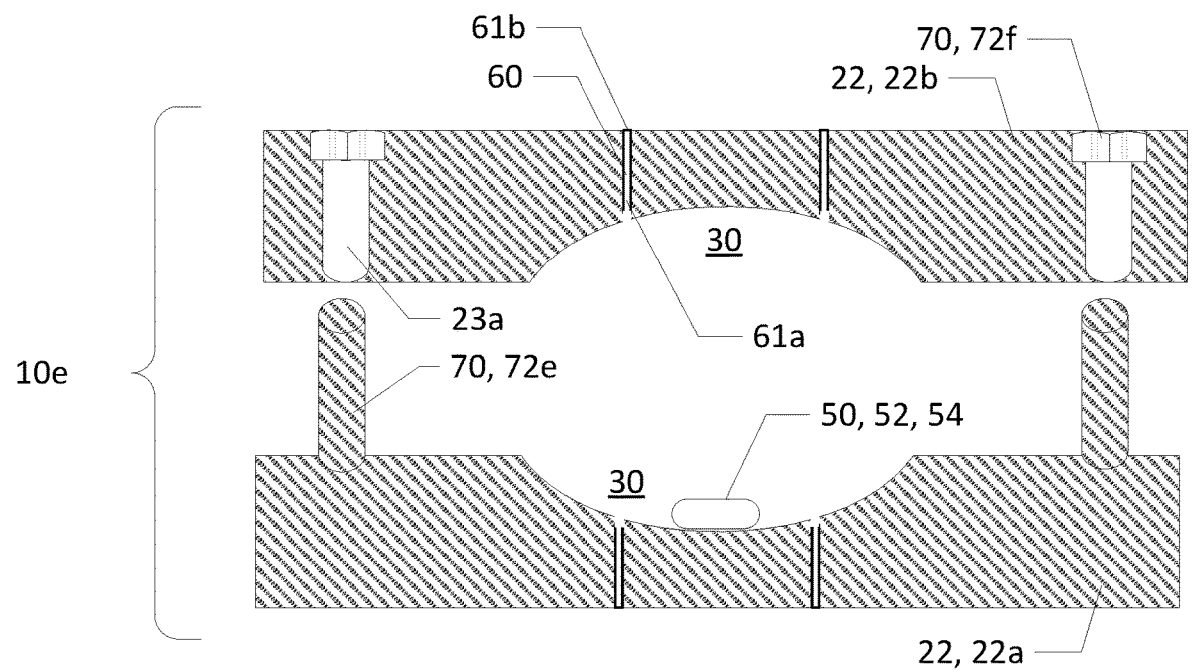
FIG. 5 is a cross-sectional view of a longitudinal half of the destruction-resistant pet toy in accordance with one or more embodiments of the present invention.

With reference to FIG. 5, in accordance with one or more embodiments of the present invention, a pet toy 10e is substantially identical to pet toy 10a and 10b. Pet toy 10c comprises a main body 20c having a plurality of body portions 22 and without access channel 40. The plurality of body portions 22 may be any suitable number of portions and may be greater than those used herein to illustrate pet toy 10b, wherein a first portion 22a and a second portion 22b are illustrated. Cavity 30 may be disposed entirely in one portion 22, or partially in several portions 22, or one cavity 30 in each of portions 22.

Pet toy 10e further comprises a fastening assembly 70 to secure one body portion 22 to another body portion 22, e.g. first portion 22a and second portion 22b. In accordance with one or more embodiments of the present invention, fastening assembly 70 comprises a screw post 72e that passes through an opening 23a in portion 22a and an opening 23b in portion 22b and a locking nut 72f. In accordance with one or more embodiments of the present invention, fastening assembly 70 comprises a screw post 72e that is molded in portion 22a and an opening 23b is created in portion 22b in and a locking nut 72f.

In accordance with one or more embodiments of the present invention, in a first step, pet toy 10e is made by molding main body 20a. If one or more scent passages 60 have not been molded into the main body during the first step, in a second step, one or more scent passages 60 are made, preferably by drilling, into main body 20a. In a third step, the portions 22 are then joined together via the fastening assembly 70. In a third step, one or more attractants 50 (imbued with the scent source) are placed in cavity 30, advantageously, without being reduced in size. In a final step, pet toy 10a is then tagged and processed as necessary for retail sales.

Sixth Embodiment

With reference to FIGS. 6a and 6b, in accordance with one or more embodiments of the present invention, a pet toy 10f is substantially identical to pet toy 10a and 10b. Pet toy 10f comprises a main body 20c having a plurality of body portions 22 and without access channel 40. The plurality of body portions 22 may be any suitable number of portions and may be greater than those used herein to illustrate pet toy 10b, wherein a first portion 22a and a second portion 22b are illustrated. Cavity 30 may be disposed entirely in one portion 22, or partially in several portions 22, or one cavity 30 in each of portions 22.

Pet toy 10f further comprises a fastening assembly 70 to secure one body portion 22 to another body portion 22, e.g. first portion 22a and second portion 22b. In accordance with one or more embodiments of the present invention, an external thread is provided on body portion 22a at a distal end and an interior thread is placed on body portion 22b is provided on an exterior surface of each portion. The two body portions are secured to each other by rotating the body portions relative to each other. The fastening assembly holds the body portions together to prevent unintended disengagement of portions 22a and 22b from each other. A locking mechanism may be used to decrease the chance of unintended disengagement of portions 22a and 22b from each other. The locking mechanism may be a thread locking mechanism such as a lock washer, a pair of ramped washers mating with each other, an adhesive applied on one or more mating threads, and/or a castle nut and pin.

In accordance with one or more embodiments of the present invention, one or more internal threads are designed to deform one or more mating external threads to prevent unintended disengagement of portions 22a and 22b from each other.

In accordance with one or more embodiments of the present invention, in a first step, pet toy 10c is made by molding each portion 22 of main body 20c. If one or more scent passages 60 have not been molded into the main body during the first step, in a second step, one or more scent passages 60 are made, preferably by drilling, into one or more or all portions 22 of main body 20b. In a third step, one or more attractants 50 (imbued with the scent source) are placed in cavity 30, advantageously, without being reduced in size. In a fourth step, all portions 22 are banded together, i.e. band 72d is placed into groove 72c. In a final step, pet toy 10c is then tagged and processed as necessary for retail sales.

Seventh Embodiment

With reference to FIGS. 7a-7i, in accordance with one or more embodiments of the present invention, a destruction-resistant pet toy 10g is intended for a dog or other animal prone to aggressive biting, gnawing, or chewing behavior, i.e. a destructive chewer. Destruction-resistant pet toy 10g includes a main body 20g comprising or consisting of a destruction resistant material; the pet toy further comprises one or more cavities 30, one or more attractants 50, one or more scent passages 60, and a fastening assembly 70.

In accordance with one or more embodiments of the present invention, the "destruction resistant material" is defined as comprising polycaprolactam. Polycaprolactam is also known as nylon 6 or polyamide 6. Preferably, the destruction resistant nylon has a density of 1.13 g/cm$^3$, hardness of 71 Shore D, a heat distortion temperature of 53° C. at 264 psi, a melting point of 220a° C., and a relational viscosity of 2.3.

In accordance with one or more embodiments of the present invention, the "destruction resistant nylon" is defined as consisting only of or substantially only of polycaprolactam.

In accordance with another embodiment, the "destruction resistant nylon" is defined as consisting of a material having hardness of 68-75 durometer Shore D.

In accordance with one or more embodiments of the present invention, the "destruction resistant nylon" is defined as comprising or consisting of one of nylon 6/6, nylon 6/12, polyamide 12, nylon 121, nylon 12, or polyamide 46.

In accordance with one or more embodiments of the present invention, the "destruction resistant material" is defined as comprising urethane, natural rubber, artificial (synthetic) rubber, and/or thermoplastic elastomer.

The base costs of the destruction resistant material and/or the destruction resistant nylon is competitive with other materials used in pet toys and the manufacturing method, typically injection molding or pressure molding, provides significant economic advantages that can be passed on to purchasers.

Main body 20g is for biting, grasping, and/or playing by a canine with its mouth. The main body 20g comprises, consists, or consists substantially of one of the varieties of destruction resistant nylon defined in this application, and therein is preferably molded of the destruction resistant material. Body 20g may have any suitable size and/or suitable shape. Pet toy 10g comprises a main body 20g having a plurality of body portions 22 and without access channel 40.

The plurality of body portions 22 may be any suitable number of portions and may be greater than those used herein to illustrate pet toy 10g, wherein a first portion 22a and a second portion 22b are illustrated. Cavity 30 may be disposed entirely in one portion 22, or partially in several portions 22, or one cavity 30 or portion of a cavity in each of a subportion of portions 22.

Therein, each body portion 22, i.e. body portion 22a and 22b, comprises a connector portion 22c and 22d, respectively, each comprising a throughbore 23a in one portion 22a and/or a partial bore 23b in the other portion 22a or 22b.

"Suitable" or "suitably" in this context refers to a size and/or shape that permit easy biting, grasping, and/or playing by a canine with its mouth, but it also refers to a size and/or shape that permits easy handling and/or throwing by the canine's owner. This, preferably, comprises a cylindrical shape, a truncated cone, a suitably sized ball, or stylized representation of a geometric object or anthropomorphic representation of an animal.

Cavity 30 is disposed in main body 20g and if preferably created during the molding process of main body 20g. Cavity 30 may be any suitable shape for housing attractant 50. "Suitable" or "suitably" in this context refers to a size and/or shape that permit attractant 50 to be inserted and held in cavity 30 so that it operatively releases a scent through passages 60 that a canine playing with the pet toy can detect by the sense of smell. Passages 60 are preferably sized 1.0 to 2.0 mm in diameter.

Attractant 50 preferably comprises a scent source 52 emitting a scent and a substrate 54 onto which scent source 52 is disposed. A canine will by its olfactory sense be attracted to the scent from scent source 52. In accordance with one or more embodiments of the present invention, scent source 52 may be a liquid or a solid. One or more chemical compounds in scent source 52 are volatized, generally at a very low concentration, and perceived by the sense of smell by the canine. Scent source 52 is sprayed on all or a portion of substrate. In accordance with one or more embodiments of the present invention, scent source 52 may be a combination of a plurality of scents.

The substrate may have any form and be a foam, paper, cardboard, an absorbent material, a cloth, a fabric material, or the like that absorbs scent source 52. In accordance with one or more embodiments of the present invention, scent source 52 may be sprayed onto one or more exterior surfaces of the substrate.

A plurality of scent passages 60 are disposed in main body 20g and preferably comprise or consist of one or more longitudinal passage connecting cavity 30 at first end 61a of access channel 40 to an exterior surface 11 of pet toy 10g at a second end 61b. Scent passages 60 may have any suitable cross-sectional shape, but preferably are circular in cross-section and may be created by drilling through main body 20g or by molding.

Scent passages 60 may be disposed evenly through main body 20g or disposed to have the least length individual and/or collective length necessary to emit a scent.

Pet toy 10g further comprises a fastening assembly 70 to secure one body portion 22 to another body portion 22, e.g. first portion 22a and second portion 22b. In accordance with one or more embodiments of the present invention, fastening assembly 70 comprises a screw 72a disposed in a first thread 74a in a bore 23a in portion 22a and a second thread 74b in a bore 23b in portion 22b. The opening of bore 23a is preferably recessed so that head 72b of screw 72a is recessed. Screw 72a joins portions 22a and 22b together. An indent 72c is disposed in head 72b so that screw 72a may be removed from main body 20g and permit body portions 22a and 22b to be separated so that attractant 50 may be exchanged or filled in one or more cavity 30. Preferably, indent 72c is a slot in which a screwdriver or more preferably a coin (such as a U.S. quarter dollar coin) since it would handier than a screwdriver may be used to turn screw 72a, as indicated in FIG.

Fastening assembly 70 may further include one or more indents 24a and extended portion 24b that mate to seat portion 22a with portion 22b.

A locking mechanism may be used to decrease the chance of unintended disengagement of portions 22a and 22b from each other. The locking mechanism may be a thread locking mechanism such as a lock washer, a pair of ramped washers mating with each other, an adhesive applied on one or more mating threads, and/or a castle nut and pin.

In accordance with one or more embodiments of the present invention, in a first step, pet toy 10g is made by molding each body portion 22 separately and molding screw 72a. Where necessary threads are either molded or machined into/onto each respective part. If one or more scent passages 60 have not been molded into the body portion 22 during the first step, in a second step, one or more scent passages 60 are made, preferably by drilling, into the respective body portion. In a third step, one or more attractants 50 are deposited in cavity 30. The body portions are then screwed together using screw 72a. In a final step, pet toy 10g is then tagged and processed as necessary for retail sales.

General Construction

In accordance with one or more embodiments of the present invention, one or more passage 60 is preferably sized 1.0 to 2.0 mm in diameter. In accordance with one or more embodiments of the present invention, one or more passage 60 is preferably sized 2.0 to 7.5 mm in diameter. In accordance with one or more embodiments of the present invention, one or more passage 60 is preferably sized ⅛ inch to ¼ inch in diameter. In accordance with one or more embodiments of the present invention, one or more passage 60 is preferably sized ¼ inch to ⅜ inch in diameter. The passage size may be chose to be aesthetically pleasing to the respective destruction-resistant pet toy. However, the diameter size of the passage is selected to be suitable based on scent source 52 emitting a scent. "Suitable" or "suitably" in this context refers to a size and/or shape that scent source 52 operatively releases a scent through passages 60 that a canine playing with the pet toy can detect by the sense of smell.

Where a screw and one or more screw threads are disclosed, for example, screw 72a disposed in a first thread 74a in bore 23a in portion 22a and second thread 74b in bore 23b in portion 22b, the screw and the screw threads may be made of the same material or different material. Therein, in accordance with one or more embodiments of the present invention, the screw has a greater hardness than one or both screw threads to avoid unintended deformations of the thread in the screws.

In accordance with one or more embodiments of the present invention, instead of or in addition to physical structures described herein, fastening assembly 70 may, wholly by itself, comprise or consist of one or more glues, adhesives, or the like to secure one body portion 22 to another body portion 22, e.g. first portion 22a and second portion 22b.

In accordance with one or more embodiments of the present invention, instead of or in addition to physical structures described herein, fastening assembly 70 may, wholly by itself, comprise or consist of solvent bonding, spin welding, or heat welding to secure one body portion 22 to another body portion 22, e.g. first portion 22a and second portion 22b.

While the invention has been described in conjunction with specific embodiments, it is to be understood that many alternatives, modifications, and variations will be apparent to those skilled in the art in light of the foregoing description.

What is claimed is:

1. A destruction-resistant pet toy for a canine, the destruction-resistant pet toy comprising:
a main body for biting, grasping, or playing by the canine with its mouth, the main body comprising a first body portion and a second body portion, the first body portion being separate from the second body portion, each of the first body portion and the second body portion having a substantially longitudinal shape, the first body portion comprising a first connector portion and the second body portion comprising a second body portion;
a first cavity and a second cavity, each cavity disposed in the main body, each cavity for holding an attractant for attracting the canine, the attractant comprising a scent source for emitting a scent, the first connector portion and the second connector portion defining together a separation between the first cavity and the second cavity;
a plurality of scent passages for passing the scent to the canine, each scent passage having a first end at first cavity or the second cavity and a second end at an exterior surface of the main body; and
a fastening assembly to join the first body portion and the second body portion together, the fastening assembly comprises a screw, the first connector portion, and the second connector portion, the screw is separate from both the first body portion and the second body portion, the screw extending through the first connector portion, and extending at least into a portion of the second connector portion;
wherein the second connector portion comprises a thread to engage with a thread of the screw to prevent unintended disengagement of the first body portion from the second body portion;
wherein each of the first cavity and the second cavity comprise a first cavity portion and a second cavity portion, the first body portion comprises the first cavity portion and the second body portion comprises the second cavity portion to form each cavity of the first cavity and the second cavity;
wherein the first cavity and the second cavity are each entirely surrounded by the first body portion and the second body portion.

2. The destruction-resistant pet toy of claim 1, further comprising an access channel for passing the attractant to the first cavity or the second cavity, the access channel extending from an exterior surface of the main body to the respective first cavity or second cavity.

3. The destruction-resistant pet toy of claim 2, further comprising a closure for closing the access channel.

4. The destruction-resistant pet toy of claim 1, wherein the screw comprises a first hardness and the first body portion or the second portion comprises a second hardness, the first hardness being greater than the second hardness, wherein the hardness is measured as a Shore durometer.

5. The destruction-resistant pet toy of claim 1, further comprising the attractant.

6. The destruction-resistant pet toy of claim 1, wherein the main body or the first body portion or the second body portion comprises a destruction resistant material comprising urethane, natural rubber, artificial rubber, synthetic rubber, or a thermoplastic elastomer, or a combination thereof.

7. The destruction-resistant pet toy of claim 1, further comprising a thread in the first connector portion to engage with the thread of the screw to prevent the unintended disengagement.

8. The destruction-resistant pet toy of claim 1, wherein the first connector portion is ring-shaped, and the second connector portion is ring-shaped.

9. The destruction-resistant pet toy of claim 1, wherein the first connector portion comprises a first bore, and the second connector portion comprises a second bore.

10. The destruction-resistant pet toy of claim 9, wherein each connector portion is unitary with the respective body portion.

11. A destruction-resistant pet toy for a canine, the destruction-resistant pet toy comprising:
- a unitary main body for biting, grasping, or playing by the canine with its mouth;
- an attractant for attracting the canine, the attractant comprising a substrate and a scent source for emitting a scent;
- a cavity disposed in the main body for holding the attractant;
- a plurality of scent passages for passing the scent to the canine, each scent passage having a first end at the cavity and a second end at an exterior surface of the main body;
- an access channel for passing the attractant to the cavity, the access channel extending from a first end at the cavity to a second end at the exterior surface of the main body; and
- a closure for sealing the access channel;
- wherein the main body comprises a destruction resistant material comprising urethane, natural rubber, artificial rubber, synthetic rubber, or a thermoplastic elastomer, or a combination thereof;
- wherein the access channel comprises a longitudinal feed axis and an access channel width perpendicular to the longitudinal feed axis, the cavity comprises a cavity width perpendicular to the longitudinal feed axis and parallel to a scent passage, the access channel width being smaller than the cavity width; and
- wherein the access channel comprises a detent fully disposed in the access channel and spaced away from the second end, the detent deterring removal of the closure from the access channel;
- wherein the closure is disposed in the access channel spaced away from the second end.

12. The destruction-resistant pet toy of claim 11, wherein the closure is a plug.

13. The destruction-resistant pet toy of claim 11, wherein the plurality of scent passages are arranged in an irregular pattern.

14. The destruction-resistant pet toy of claim 11, wherein the plurality of scent passages are arranged in a geometric pattern.

15. The destruction-resistant pet toy of claim 11, further comprising the attractant.

* * * * *